United States Patent
Hutchison et al.

(10) Patent No.: US 8,614,799 B2
(45) Date of Patent: Dec. 24, 2013

(54) MEMORY PAGING

(75) Inventors: Gordon Douglas Hutchison, Eastleigh Hants (GB); Matthew Francis Peters, Winchester (GB); Emma Louise Shepherd, Abingdon (GB)

(73) Assignee: International Business Machines Corporation, Armonk, NY (US)

( * ) Notice: Subject to any disclaimer, the term of this patent is extended or adjusted under 35 U.S.C. 154(b) by 1203 days.

(21) Appl. No.: 11/421,508

(22) Filed: Jun. 1, 2006

(65) Prior Publication Data

US 2007/0121162 A1 May 31, 2007

(30) Foreign Application Priority Data

Jun. 29, 2005 (GB) .................................. 0513223.8

(51) Int. Cl.
*G06F 3/12* (2006.01)
*G06F 15/00* (2006.01)

(52) U.S. Cl.
USPC .......... 358/1.13; 358/1.9; 358/1.15; 711/161; 718/101

(58) Field of Classification Search
USPC ........... 358/1.11–1.18, 1.9; 711/161; 718/101
See application file for complete search history.

(56) References Cited

U.S. PATENT DOCUMENTS

| | | | | |
|---|---|---|---|---|
| 5,675,752 A * | 10/1997 | Scott et al. | .................... | 715/866 |
| 5,893,121 A * | 4/1999 | Ebrahim et al. | ..................... | 1/1 |
| 6,417,869 B1 * | 7/2002 | Do | ................ | 715/718 |
| 6,785,013 B1 * | 8/2004 | Ota et al. | .................... | 358/1.15 |
| 6,854,115 B1 | 2/2005 | Traversat et al. | | |
| 6,901,425 B1 * | 5/2005 | Dykes et al. | .................. | 709/203 |
| 2003/0051095 A1 * | 3/2003 | Artigalas et al. | .............. | 711/111 |
| 2005/0052679 A1 * | 3/2005 | Green et al. | ................. | 358/1.14 |
| 2005/0146731 A1 * | 7/2005 | Mitani | ........................... | 358/1.1 |

* cited by examiner

*Primary Examiner* — Huo Long Chen
(74) *Attorney, Agent, or Firm* — Lee Law, PLLC; Christopher B. Lee

(57) ABSTRACT

A method of paged memory management for a software process executing in a memory of a computer system, the software process having a first operating mode and a second operating mode, and the software process having associated memory page use information for determining a set of pages to be maintained in the memory. The method comprises recording the memory page use information to a data store as first operating mode memory page use information in response to a determination that the software process leaves the first operating mode, and retrieving the first operating mode memory page use information in response to a determination that the software process enters the first operating mode.

15 Claims, 4 Drawing Sheets

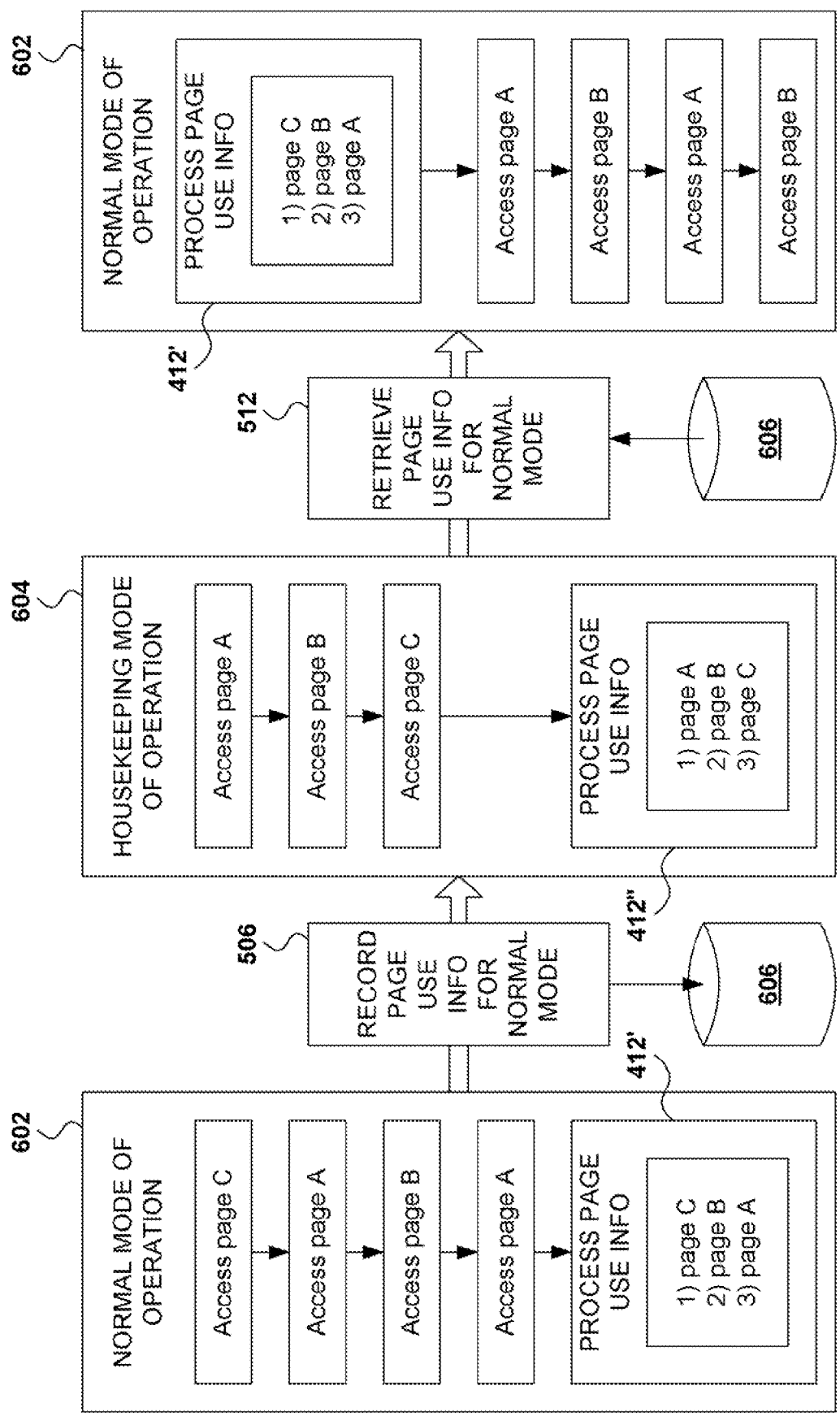

MEMORY PAGING

FIELD OF THE INVENTION

The present invention relates to a paging memory management system. In particular, it relates to a paging memory management system for a software process which operates in multiple operating modes.

BACKGROUND

Virtual memory management systems in computer systems provide for the use of secondary storage devices, such as disk storage devices, to supplement physical memory, such as RAM, in order to increase the logical memory capacity of the computer system. Physical memory is used by processes executing in the computer system until the capacity of physical memory is reached, at which point blocks of data in the physical memory are copied to the secondary storage device in order to free up physical memory. Subsequently, when the copied blocks are later required, they can be copied back into physical memory. The blocks are commonly referred to as "pages" and have a size determined by the hardware or software of the computer system. This approach to virtual management can therefore be known as paged memory management.

FIG. 1 is a schematic diagram illustrating a conceptual paged memory management system for a computer system as is well known in the prior art. A software process 102 resident in a memory of the computer system and executing on a processor of the computer system includes a set of resident pages 104. Resident pages 104 are so-called because they are present in the physical memory of the computer system. Additionally, process 102 has further pages 108 which are not resident in physical memory but are instead stored on a secondary storage device 106 such as a disk storage device or a secondary memory storage. These further non-resident pages are called "paged-out" pages 108.

The computer system further includes a memory paging subsystem 110, which is a hardware or software component for providing virtual memory and memory paging services to processes executing in the computer system. For example, the memory paging subsystem 110 can be a facility provided by an operating system executing on the computer system. The memory paging subsystem 110 is responsive to memory access requests from software process 102 and in the event of a requirement to provide free physical memory, or to swap one or more resident pages 104 with one or more paged-out pages 108, undertakes these tasks. Inevitably, these tasks will involve the memory paging subsystem 110 identifying one or more of the resident pages 104 to be paged-out to the secondary storage device 106, and therefore involves an identification of which of the resident pages 104 is most appropriate for paging-out.

One way of identifying which of the resident pages 104 should be paged-out is to determine first which of the resident pages 104 the software process 102 is likely to require in physical memory in the near future. In this way, those pages which are less likely to be required by process 102 can be considered for paging-out. It is difficult to know with certainty which pages are or are not likely to be required since events in the execution of software process 102 which have not yet occurred may determine what branch in the process 102 will take and thus what memory will need to be accessed.

To address this problem, the memory paging subsystem 110 can operate on the principle that memory access by process 102 in the near future will be the same as memory access in the recent past. To this end, memory paging subsystem 110 maintains a list of memory pages accessed by process 102 in least recently used order as process page use information 112. Thus, when it is necessary for the memory paging subsystem 110 to identify one of the resident pages 104 for paging-out, pages which have been least recently used according to the process page use information 112 are preferred candidates.

This approach is effective for a software process 102 where past behavior is a good indicator of future behavior. However, some software processes execute in multiple modes, or phases, of operation. Each mode can involve very different behavioral characteristics which result in the process behaving in one manner in one mode and another manner in a different mode.

FIG. 2 is a block diagram illustrating a software process 102 executing in two modes. The software process 102 initially executes in a first mode of operation 202. For example, the first mode 202 can be an initial mode of operation on startup of the process 102, or a business logic mode wherein the process 102 undertakes operations to solve business problems. Alternatively, the first mode 202 can be an active mode, as opposed to an inactive or suspended mode. Further alternatively, the first mode 202 can be the mode of operation in which the process 102 executes for the majority of the total execution time. Other examples of a first mode 202 of operation will be apparent to those skilled in the art. In the first mode 202, the process 102 behaves in a way which results in a particular profile of memory accesses. For example, a particular subset of memory pages may be frequently accessed. Consequently, during execution in the first mode 202, the process page use information 112 reflects the memory page usage of the process 102 in the first mode 202 of operation.

After some time the process 102 switches to a second mode of operation 204. For example, the second mode of operation 204 can be a housekeeping mode, such as garbage collection, data compression, auditing, tracing, logging, monitoring, scanning or sweeping. Alternatively, the second operating mode could be a suspended operating mode, as opposed to an active operating mode. Such a suspended operating mode can include suspension of execution of the process 102, or removal of power from the computer system.

Other examples of a second mode 204 of operation will be apparent to those skilled in the art. In the second mode 204, the process behaves in a way which is different than the first mode 202, and in particular, which involves a different profile of memory accesses. For example, a different subset of memory pages may be accessed by the process 102 in the second mode 204 compared to the subset of memory pages accessed in the first mode 202. Alternatively, in the second mode 204, the process 102 may be required to access each and every memory page as part of a general housekeeping operation. Consequently, during execution in the second mode 204, the process page use information 112 reflects the memory page usage of the process 102 in the second mode 204 of operation.

Further after some time, the process 102 leaves the second mode of operation 204 and returns to the first mode of operation 202. For example, a switch back to the first mode 202 might occur on completion of a housekeeping task in the second mode of operation 204. Whilst the profile of memory accesses in the first mode 202 is different than that of the second mode 204, the process page use information 112 at the point when the process 102 returns to the first mode of operation 202 continues to reflect the second mode of operation 204 in which the process was previously executing.

Since the first mode of operation 202 has a profile of memory accesses which is different than that of the second mode 204, the process page use information 112 is inaccurate for the first mode 202 and results in an inefficient management of memory pages by the memory paging subsystem 110. This inefficient management of memory pages arises because the page use information 112 reflects pages used in the second mode of operation 204 where memory access requirements were different than the first mode of operation 202. This can result in resident pages 104 being paged out inappropriately by the memory paging subsystem 110. It would therefore be advantageous to provide for efficient memory paging for software processes which operate in multiple different modes, each mode having different memory access requirements.

SUMMARY

The present invention accordingly provides, in a first aspect, a method of paged memory management for a software process executing in a memory of a computer system, the software process having a first operating mode and a second operating mode, and the software process having associated memory page use information for determining a set of pages to be maintained in the memory, the method comprising the steps of: in response to a determination that the software process leaves the first operating mode, recording the memory page use information to a data store as first operating mode memory page use information; in response to a determination that the software process enters the first operating mode, retrieving the first mode memory page use information.

In this way, the process page use information is retained by storing it as the first mode process page use information during a change in operating mode of the software process. Thus, when the software process exits the first operating mode and subsequently re-enters the first operating mode, the process page use information is maintained and restored, and is consequently not affected by the operation of the software process in a different operating mode to the first operating mode.

Preferably the memory page use information comprises information for a set of memory pages accessed by the executable software process. Preferably the memory page use information is ordered by the recency of use of the memory pages accessed by the executable software process. Preferably the second operating mode is an operating mode for the execution of a software housekeeping routine. Preferably the software housekeeping routine is a garbage collection routine for identifying discardable data structures in the memory of the computer system.

Preferably the method further comprises: in response to a determination that the software process leaves the second operating mode, recording the memory page use information to a data store as second operating mode memory page use information; in response to a determination that the software process enters the second operating mode, retrieving the second operating mode memory page use information from the data store.

Preferably the second operating mode is a suspended operating mode in which execution of the software process is suspended. Preferably, in the suspended operating mode the computer system is not provided with power. Preferably the second mode is destructive of the memory page use information associated with the first operating mode.

The present invention accordingly provides, in a second aspect, an apparatus for paged memory management for a software process executing in a memory of a computer system, the software process having a first operating mode and a second operating mode, and the software process having associated memory page use information for determining a set of pages to be maintained in the memory, the apparatus comprising: in response to a determination that the software process leaves the first operating mode, means for recording the memory page use information to a data store as first operating mode memory page use information; in response to a determination that the software process enters the first operating mode, means for retrieving the first operating mode memory page use information.

The present invention accordingly provides, in a third aspect, a computer program product comprising computer program code which, when executed on a data processing system, instructs the data processing system to carry out the method described above.

The present invention accordingly provides, in a fourth aspect, a data processing system comprising: a central processing unit; a memory subsystem; and input/output subsystem; and a bus subsystem for interconnecting the central processing unit, the memory subsystem, the input/output subsystem; and the apparatus as described above.

BRIEF DESCRIPTION OF THE DRAWINGS

A preferred embodiment of the present invention will now be described, by way of example only, with reference to the accompanying drawings, in which:

FIG. 6 is a block diagram illustrating modes of execution of a software process in an exemplary implementation of a preferred embodiment of the present invention.

DETAILED DESCRIPTION

Figure 3:
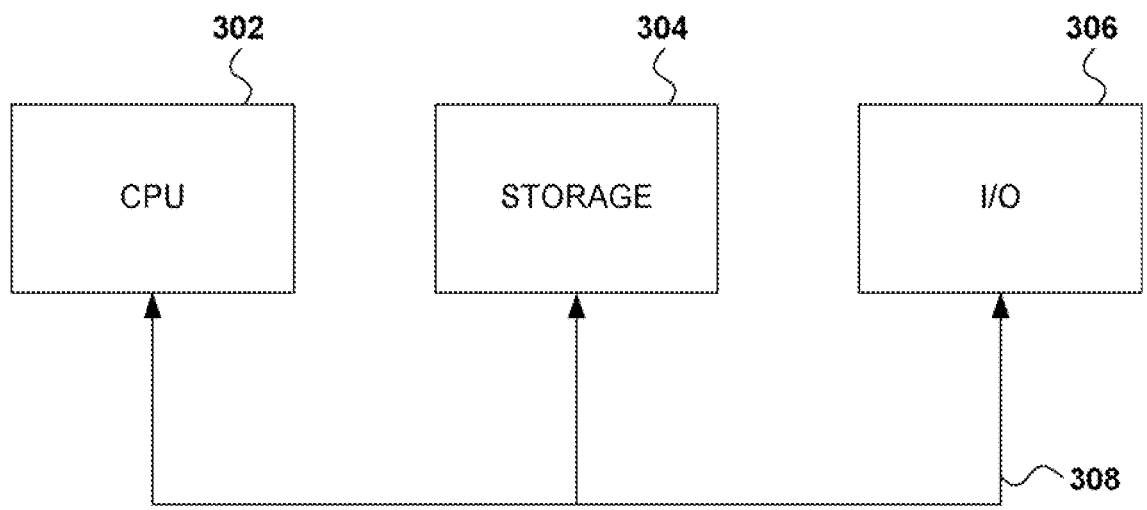
FIG. 3 is a block diagram of a computer system suitable for the operation of embodiments of the present invention.

FIG. 3 is a block diagram of a computer system suitable for the operation of embodiments of the present invention. A central processor unit (CPU) 302 is communicatively connected to a storage 304 and an input/output (I/O) interface 306 via a data bus 308. The storage 304 can be any read/write storage device such as a random access memory (RAM) or a non-volatile storage device. An example of a non-volatile storage device includes a disk or tape storage device. The I/O interface 306 is an interface to devices for the input or output of data, or for both input and output of data. Examples of I/O devices correctable to I/O interface 306 include a keyboard, a mouse, a display (such as a monitor) and a network connection.

Figure 1:
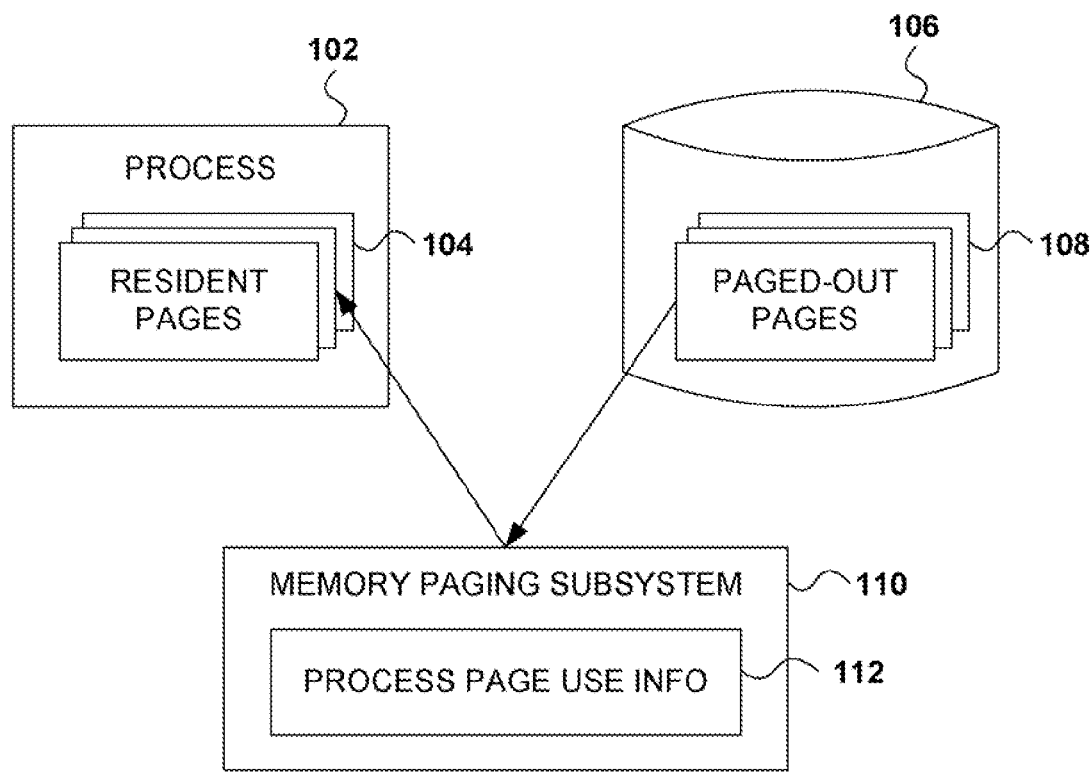
FIG. 1 is a schematic diagram illustrating a conceptual paged memory management system for a computer system as is well known in the prior art.
Figure 2:
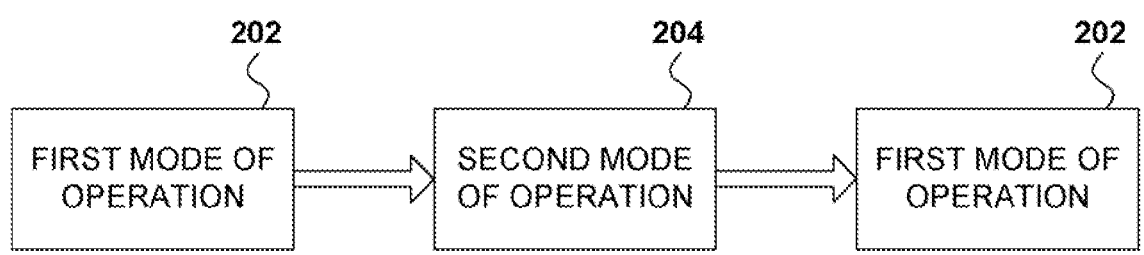
FIG. 2 is a block diagram illustrating a software process executing in two modes.
Figure 4:
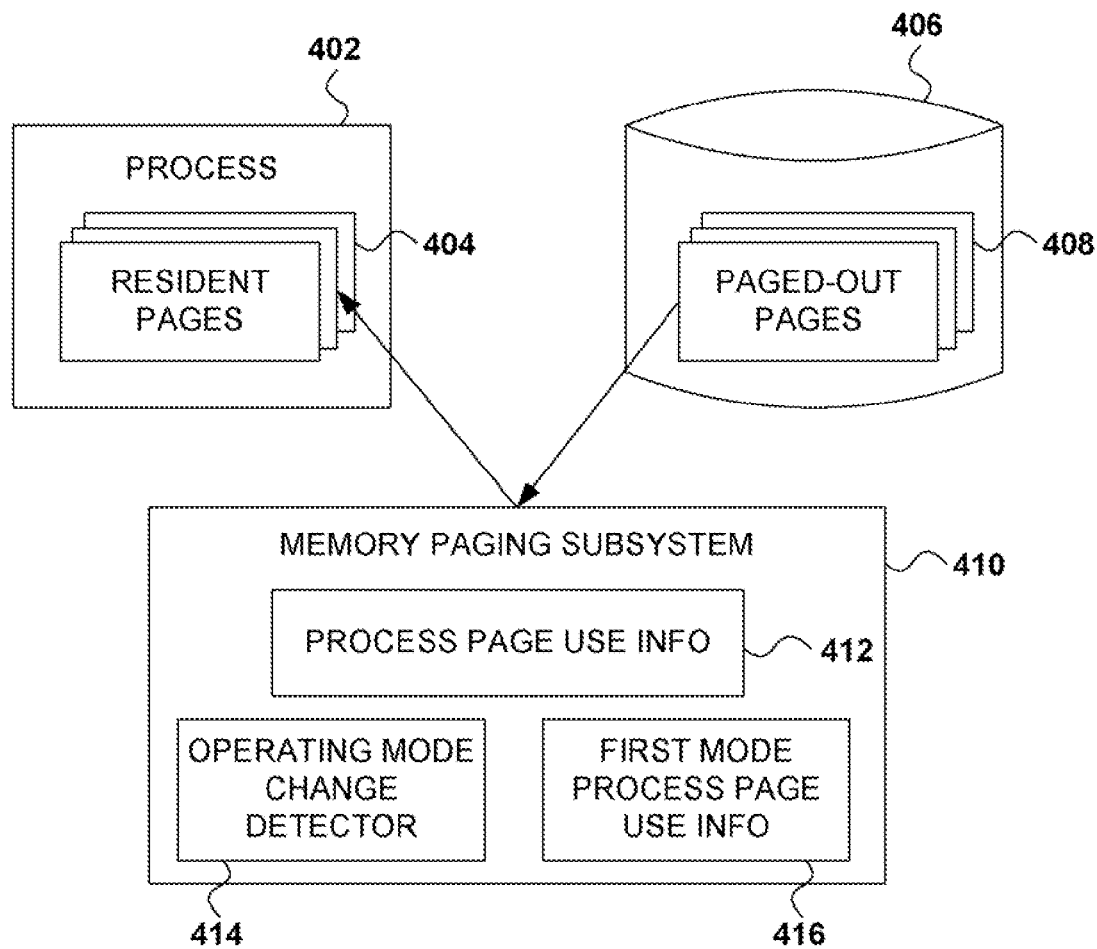
FIG. 4 is a schematic diagram illustrating a paged memory management system for a computer system in accordance with a preferred embodiment of the present invention.

FIG. 4 is a schematic diagram illustrating a paged memory management system for a computer system in accordance with a preferred embodiment of the present invention. Many of the elements of FIG. 4 are identical to those described above with respect to FIG. 1 and these will not be repeated here.

In FIG. 4 the memory paging subsystem 410 further includes an operating mode change detector 414 which is operable to detect, or be informed of, changes in the operating mode of the software process 402. For example, the operating mode change detector 414 is a callable software routine or function which is called by process 402 when there is a change of operating mode. Alternatively, the operating mode change detector 414 is a software routine capable of monitoring the software process 402 in order to determine when process 402 undergoes a change of operating mode. Such monitoring may monitor memory accesses of the process 402, or tracing or logging information generated by process 402, or a graphical user interface associated with process 402.

Alternative techniques for detecting or being informed of a change in operating mode of process 402 will be apparent to persons skilled in the art. Whilst the operating mode change detector 414 is illustrated as being comprised as part of the memory paging subsystem 410, it will be appreciated by those skilled in the art that it could alternatively be provided separately from the memory paging subsystem 410, whilst being accessible to, or operable to inform, the memory paging subsystem 410.

The memory paging subsystem 410 further includes first mode process page use information 416 which is a copy of the process page use information 412 generated when the software process 402 leaves the first mode of operation 202. Alternatively, the process page use information 412 of FIG. 4 can be a pointer to the first mode page use information 416 when in the first mode of operation 202.

The process page use information 412 can then point to an alternative data structure when operating in a different operating mode (not shown). The first mode process page use information 416 can be stored in a memory of the computer system, or on a data storage device such as a fixed disk device. Alternatively, the first mode process page use information 416 can be stored in a structured data storage resource such as a database. Whilst the first mode process page use information 416 is illustrated as being comprised as part of the memory paging subsystem 410, it will be appreciated by those skilled in the art that it could alternatively be maintained separately from the memory paging subsystem 410, whilst being accessible to the memory paging subsystem 410. This is also true of the process page use information 412 which could also be maintained separately from the memory paging subsystem 410, whilst being accessible to the memory paging subsystem 410.

In use, the memory paging subsystem 410 maintains the process page use information 412 for the software process 402 in accordance with techniques known in the art, such as the "least recently used" technique described above. Subsequently, the memory paging subsystem 410 detects the software process 402 exiting the first operating mode 202 using the operating mode change detector 414.

Once detected, the memory paging subsystem 410 generates a copy of the process page use information 412 as the first mode process page use information 416. Execution of the software process 402 continues until the memory paging subsystem 410 detects the software process 402 re-entering the first operating mode 202 using the operating mode change detector 414. Subsequently, the memory paging subsystem 410 reinstates the process page use information 412 for the first operating mode 202 from the first mode process page use information 416. One way this can be achieved is by copying the first mode process page use information 416 into the process page use information 412. The software process 402 then continues operation in the first operating mode 202 using the process page use information 412.

In this way, the process page use information 412 is retained by storing it as the first mode process page use information 416 during a change in operating mode of the software process 402. Thus, when the software process 402 exits the first operating mode 202 and subsequently re-enters the first operating mode 202, the process page use information 412 is maintained and restored, and is consequently not affected by the operation of the software process 402 in a different operating mode to the first operating mode 202.

Whilst only first mode process page use information 416 is illustrated as being stored by the memory paging subsystem 410, it will be apparent to those skilled in the art that similar process page use information for other modes of operation could equally be stored by the memory paging subsystem 410. This would allow process page use information 412 for multiple modes of operation of the software process 402 to be maintained simultaneously. In this way, process page use information 412 appropriate to a current operating mode can be used by the memory paging subsystem 410.

Figure 5:
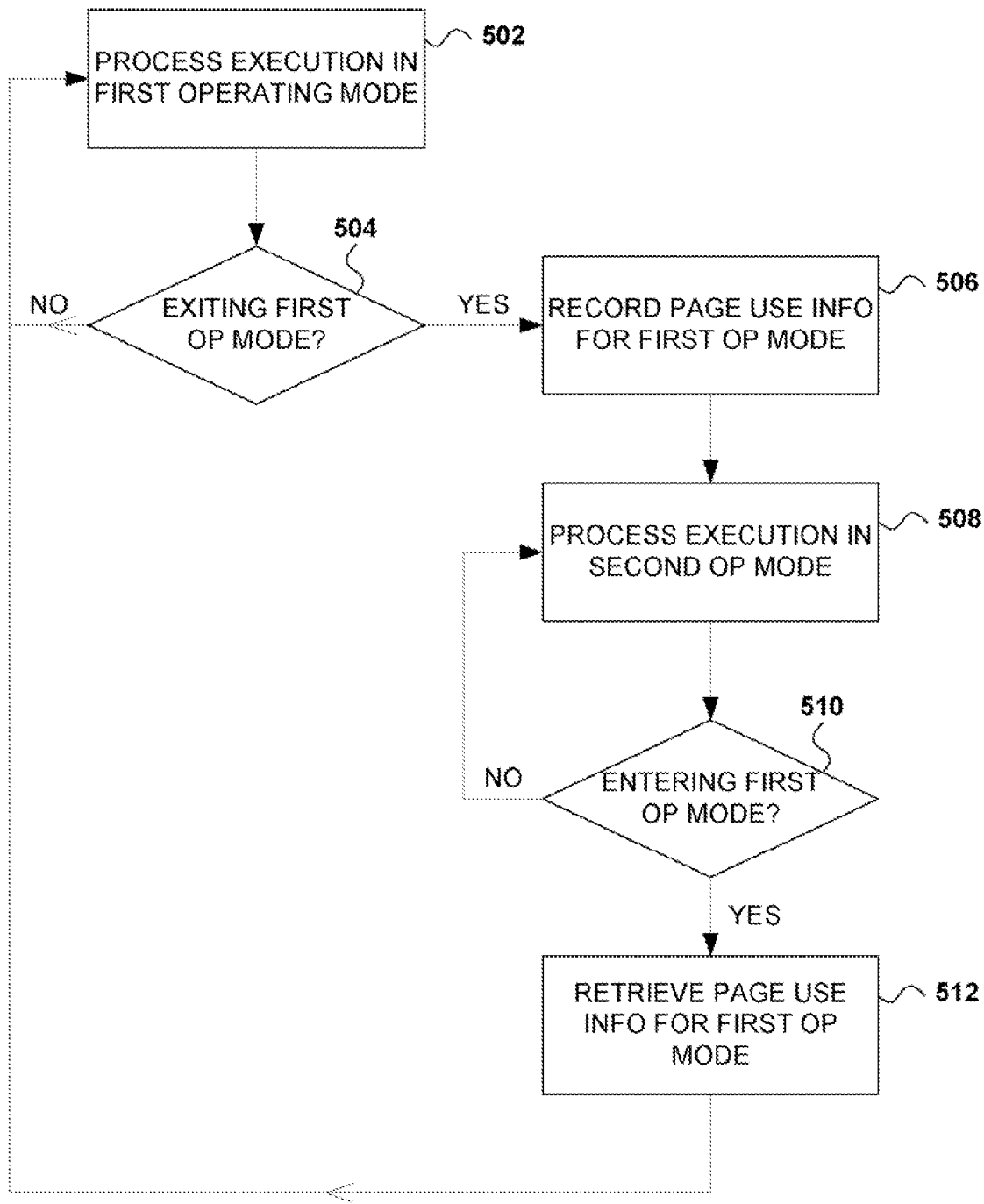
FIG. 5 is a flowchart of a method of the memory paging subsystem of FIG. 4 in accordance with a preferred embodiment of the present invention.

FIG. 5 is a flowchart of a method of the memory paging subsystem 410 of FIG. 4 in accordance with a preferred embodiment of the present invention. At step 502, the process 402 executes in the first operating mode 202. At step 504, the operating mode change detector 414 identifies that the process 402 is exiting the first operating mode and proceeds to step 506 where the process page use information 412 is recorded as the first mode process page use information 416. Subsequently at step 508, the process executes in another operating mode, such as the second operating mode 204. At step 510 the operating mode change detector 414 identifies that the process 402 is re-entering the first operating mode and proceeds to step 512 where the first mode process page use information 416 is copied into the process page use information 412 for use during the first operating mode.

FIG. 6 is a block diagram illustrating modes of execution of a software process 402 in an exemplary implementation of a preferred embodiment of the present invention. The software process 402 undergoes two changes of operating mode: firstly a change from a normal mode of operation 602 to a housekeeping mode of operation 604; and secondly a change from the housekeeping mode of operation 604 back to the normal mode of operation 602. Each of these modes will now be considered in turn with respect to the method of FIG. 5 to demonstrate how the method of a preferred embodiment of the present invention is effective in providing page use information for software process 402 which operates in multiple operating modes.

Firstly, referring to step 502 of FIG. 5, the software process 402 executes in the normal operating mode 602 of FIG. 6. As is illustrated in FIG. 6, in this mode the process 402 accesses pages C, A, B and A in that order. Consequently, the process page use information 412' includes entries in order of least recently used as pages C, B, and A. Page C is at the top of the list in the process page use information 412' because in operating mode 602, process 402 accessed page C least recently. Page B is next in the list in the process page use information 412' because in operating mode 602, process 402 accessed page B second to least recently. Page A is last in the list in the process page use information 412' because in operating mode 602, process 402 accessed page A most recently.

Subsequently, at step 504 of FIG. 5, the software process 402 exits the normal operating mode 602 to enter the housekeeping operating mode 604. This is detected by the operating mode change detector 414 and at step 506 of FIG. 5 the page use information 412' for the normal operating mode 602 is stored to a storage medium 606. This is further illustrated by way of routine 506 of FIG. 6.

Subsequently, at step 508 of FIG. 5, the software process 402 executes in the housekeeping operating mode 604 of FIG. 6. As is illustrated in FIG. 6, in this mode the process 402 accesses pages A, B and C in that order. Consequently, the process page use information 412" includes entries in order of least recently used as pages A, B, and C. Page A is at the top of the list in the process page use information 412" because in operating mode 604, process 402 accessed page A least recently. Page B is next in the list in the process page use information 412" because in operating mode 604, process 402 accessed page B second to least recently. Page C is last in the list in the process page use information 412" because in operating mode 604, process 402 accessed pace C most recently.

Subsequently, at step 510 of FIG. 5, the software process 402 exits the housekeeping operating mode 604 and re-enters the normal operating mode 602. This is detected by the operating mode change detector 414 and at step 512 of FIG. 5 the page use information 412' for the normal operating mode 602 is retrieved from the storage medium 606. This is further illustrated by way of routine 512 of FIG. 6.

Subsequently, the method of FIG. 5 returns to step 502 where the software process 402 continues to operate in the normal operating mode 602. The process page use information 412' is consistent with that from the previous operation in the normal operating mode 602 described above, and so the change of operating mode from the normal operating mode 602 to the housekeeping operating mode 604, and back again, has had no effect on the contents of the process page use information 412' which was been retrieved from the storage medium 606. Consequently, the memory paging subsystem 410 is able to use appropriate process page use information for the current operating mode in determining which of the resident pages 404 should be candidates for paging-out.

What is claimed is:

1. A method of paged memory management for a software process executing in a computer system, the method comprising;
    monitoring, by a memory paging subsystem via an operating mode change detector, memory accesses of a first operating mode of the software process, where the first operating mode comprises an operational mode and comprises associated first process memory page use information comprising a first data structure that identifies a first set of process memory pages accessed by the monitored memory accesses of the software process during execution in the first operating mode;
    detecting, based upon the monitored memory accesses of the first operating mode of the software process, a change in the operating mode of the software process to a second operating mode;
    in response to a determination, responsive to monitoring the memory accesses of the first operating mode of the software process, that the software process leaves the first operating mode;
        copying the first process memory page use information as first operating mode memory page use information; and
        storing the first operating mode memory page use information;
    monitoring, via the operating mode change detector, memory accesses of the second operating mode of the software process, where the second operating mode comprises a housekeeping mode and comprises associated second process memory page use information comprising a second data structure that identifies a second set of process memory pages accessed by the monitored memory accesses of the software process during execution in the second operating mode;
    in response to a determination, responsive to monitoring the memory accesses of the second operating mode of the software process, that the software process leaves the second operating mode:
        copying the second process memory page use information as second operating mode memory page use information; and
        storing the second operating mode memory page use information;
    in response to a determination, responsive to monitoring first additional memory accesses of the software process, that the software process re-enters the first operating mode, retrieving the stored first operating mode memory page use information;
    where, at the re-entry into the first operating mode, the software process operates in the first operating mode using the first set of process memory pages identified within the first data structure of the retrieved first operating mode memory page use information, and the first set of process memory pages accurately reflect memory page usage and the monitored memory accesses of the first operating mode of the software process; and
    in response to a determination, responsive to monitoring second additional memory accesses of the software process, that the software process re-enters the second operating mode, retrieving the stored second operation mode memory page use information;
    where, at the re-entry into the second operating mode, the software process operates in the second operating mode using the second set of process memory pages identified within the second data structure of the retrieved second operating mode memory page use information, and the second set of process memory pages accurately reflect memory page usage and the monitored memory accesses of the second operating mode of the software process.

2. The method of claim 1, where the first set of process memory pages identified within the first data structure of the first process memory page use information is ordered by the recency of use of the process memory pages accessed by the executable software process during execution in the first operating mode.

3. The method of claim 1, where the housekeeping mode is an operating mode for the execution of a software housekeeping routine.

4. The method of claim 3, where the software housekeeping routine is a garbage collection routine for identifying discardable data structures in a memory of the computer system.

5. The method of claim 1, where the second operating mode is a suspended operating mode in which execution of the software process is suspended.

6. The method of claim 5, where in the suspended operating mode the computer system is not provided with power.

7. The method of claim 1, where the second operating mode is destructive of the stored memory page use information associated with the first operating mode.

8. An apparatus for paged memory management for a software process executing in a computer system, the apparatus comprising:
    a memory; and
    a processor programmed to:
        monitor, by a memory paging subsystem, memory accesses of a first operating mode of the software process, where the first operating mode comprises an operational mode and comprises associated first process memory page use information comprising a first data structure that identifies a first set of process memory pages accessed by the monitored memory accesses of die software process during execution in the first operating mode;

detect, used upon the monitored memory accesses of the first operating mode of the software process, a change in the operating mode of the software process to a second operating mode;

in response to a determination, responsive to monitoring the memory accesses of the first operating mode of the software process, that the software process leaves the first operating mode:
  copy the first process memory page use information as fast operating mode memory page use information; and
  store the first operating mode memory page use information in the memory;

monitor via the memory paging subsystem, memory accesses of the second operating mode of the software process, where the second operating mode comprises a housekeeping mode and comprises associated second process memory page use information comprising a second data structure that identifies a second set of process memory pages accessed by the monitored memory accesses of the software process during execution in the second operating mode;

in response to a determination, responsive to monitoring the memory accesses of the second operating mode of the software process, that the software process leaves the second operating mode:
  copy the second process memory page use information as second operating mode memory page use information; and
  store the second operating mode memory page use information in the memory;

in response to a determination, responsive to monitoring first additional memory accesses of the software process, that the software process reenters the first operating mode, retrieve the stored first operating mode memory page use information;

where, at the re-entry into the first operating mode, the software process operates in the first operating mode using the first set of process memory pages identified within the first data structure of the retrieved first operating mode memory page use information, and the first set of process memory pages accurately reflect memory page usage and the monitored memory accesses of the first operating mode of the software process; and in response to a determination, responsive to monitoring second additional memory accesses of the software process, that the software process re-enters the second operating mode, retrieve the stored second operating mode memory page use information;

where, at the re-entry into the second operating mode, the software process operates in the second operating mode using the second set of process memory pages identified within the second data structure of the retrieved second operating mode memory page use information, and the second set of process memory pages accurately reflect memory page usage and the monitored memory accesses of the second operating mode of the software process.

9. The apparatus of claim 8, where the first set of process memory pages identified within the first data structure of the first process memory page use information is ordered by the recency of use of the process memory pages accessed by the executable software process during execution in the first operating mode.

10. The apparatus of claim 8, where the housekeeping mode is an operating mode for the execution of a software housekeeping routine.

11. The apparatus of claim 10, where the software housekeeping routine is a garbage collection routine for identifying discardable data structures in the memory.

12. The apparatus of claim 8, where the second operating mode is a suspended operating mode in which execution of the software process is suspended.

13. The apparatus of claim 12, where in the suspended operating mode the computer system is not provided with power.

14. The apparatus of claim 8, where the second operating mode is destructive of the stored memory page use information associated with the first operating mode.

15. A computer program product for paged memory management for a software process executing in a computer system, the computer program product comprising a computer readable storage device having computer readable program code embedded therein, the computer readable program code comprising:
  computer readable program code configured to monitor, by a memory paging subsystem, memory accesses of a first operating mode of to software process, where the first operating mode comprises an operational mode and comprises associated first process memory page use information comprising a first data structure that identifies a first set of process memory pages accessed by the monitored memory accesses of the software process during execution in the first operating mode;
  computer readable program code configured to detect, based upon the monitored memory accesses of the first operating mode of the software process, a change in an operating mode of the software process to a second operating mode;
  computer readable program code configured to, in response to a determination, responsive to monitoring the memory accesses of the first operating mode of the software process, that the software process leaves the first operating mode:
    copy the first process memory page use information as first operating mode memory page use information; and
    store the first operating mode memory page use information;
  computer readable program code configured to monitor, by the memory paging subsystem, memory accesses of the second operating mode of the software process, where the second operating mode comprises a housekeeping mode and comprises associated second process memory page use information comprising a second data structure that identifies a second set of process memory pages accessed by the monitored memory accesses of the software process during execution in the second operating mode;
  computer readable program code configured to, in response to a determination, responsive to monitoring the memory accesses of the second operating mode of the software process, that the software process leaves the second operating mode:
    copy the second process memory page use information as second operating mode memory page use information; and store the second operating mode memory page use information;

computer readable program code configured to in response to a determination, responsive to monitoring first additional memory accesses of the software process, that the software process re-enters the first operating mode, retrieve the stored first operating mode memory page use information;

where, at re-entry into the first operating mode, the software process operates in the first operating mode using the first set of process memory pages identified within the first data structure of the retrieved first operating mode memory page use information, and the first set of process memory pages accurately reflect memory page usage and the monitored memory accesses of the first operating mode of the software process, and computer readable program code configured to, in response to a determination, responsive to monitoring second additional memory accesses of the software process, that the software process re-enters the second operating mode, retrieve the stored second operating mode memory page use information;

where, at the re-entry into the second operating mode, the software process operates in the second operating mode using the second set of process memory pages identified within the second data structure of the retrieved second operating mode memory cage use information, and the second set of process memory pages accurately reflect memory page usage and the monitored memory accesses of the second operating mode of the software process.

* * * * *